United States Patent [19]

Bassi et al.

[11] Patent Number: 4,889,888

[45] Date of Patent: Dec. 26, 1989

[54] ELASTOPLASTIC COMPOSITIONS AND PROCESS FOR PREPARING THEM

[75] Inventors: Mauro Bassi; Enea Garagnani; Giuseppe Gorini, all of Ferrara, Italy

[73] Assignee: Himont Incorporated, Wilmington, Del.

[21] Appl. No.: 282,701

[22] Filed: Dec. 9, 1988

[30] Foreign Application Priority Data

Dec. 11, 1987 [IT] Italy ............................. 22946 A/87

[51] Int. Cl.$^4$ ................ C08L 23/26; C08L 25/04; C08L 51/06; C08L 53/02

[52] U.S. Cl. .......................... 525/75; 525/86; 525/87; 525/98; 525/99; 525/70; 525/194; 525/211; 525/240; 525/133

[58] Field of Search ................. 525/194, 99, 75, 86, 525/87, 240, 133

[56] References Cited

U.S. PATENT DOCUMENTS

| | | | |
|---|---|---|---|
| 3,806,558 | 4/1974 | Fischer | 525/240 |
| 4,202,801 | 5/1980 | Petersen | 525/232 |
| 4,258,145 | 3/1981 | Wright | 525/99 |
| 4,311,628 | 1/1982 | Sabet et al. | 525/232 |
| 4,386,187 | 5/1983 | Grancio et al. | 525/99 |
| 4,530,795 | 9/1982 | Bohm et al. | 525/194 |
| 4,594,390 | 6/1986 | Sabet et al. | 525/240 |
| 4,607,074 | 8/1986 | Hazelton et al. | 525/192 |
| 4,690,976 | 9/1987 | Hahnfeld | 525/70 |
| 4,704,431 | 11/1987 | Stuart et al. | 525/75 |
| 4,716,197 | 12/1987 | Seiss et al. | 525/75 |
| 4,745,149 | 5/1988 | Eisele et al. | 524/505 |
| 4,808,665 | 2/1989 | Patel et al. | 525/240 |

*Primary Examiner*—Carman J. Seccuro

[57] ABSTRACT

Elastoplastic compositions comprising a continuous crystalline polyolefin phase and at least two phases discretely dispersed in the polyolefin phase, one of which is a dynamically cured EPDM rubber and the other an amorphous and thermoplastic styrene polymer, in which at least 80% of the dispersed particles has a maximum size preferably below 5 μm.

The compositions are prepared by masticating a mixture of the components under conditions of dynamic curing of rubber.

8 Claims, No Drawings

ELASTOPLASTIC COMPOSITIONS AND PROCESS FOR PREPARING THEM

DESCRIPTION

The present invention relates to elastoplastic compositions comprising a continuous crystalline polyolefin phase and at least two polymeric phases dispersed in the polyolefin matrix, of which one phase is a dynamically cured EPDM rubber and the other phase is an amorphous and thermoplastic styrene polymer.

Elastoplastic compositions based on crystalline olefin polymers and dynamically cured EPDM rubbers are well known in literature.

Such compositions and the preparation thereof by mixing the components under conditions of dynamic curing are described in particular in U.S. Pat. Nos. 3,806,558, 4,130,535 and 4,311,628.

The compositions prepared by the dynamic curing method have, in common with all the compositions based on plastomeric resins and cross-linked elastomers, the problem of being more difficult to process as the percentage of cross-linked elastomeric component in them is increased.

For example, compositions comprising a cross-linked EPDM rubber in an amount higher than 70–75% by weight with respect to the polyolefin phase are totally unprocessable.

The most interesting curative systems utilized in rubber curing exhibit, furthermore, the disadvantage of giving rise to remarkable equipment corrosion problems during the mastication of the components.

Thus, there is a great need for elastoplastic compositions which are easily processable and do not require the use of curative systems which cause the above mentioned corrosion problems.

It has already been suggested, in the case of compositions comprising a crystalline olefin polymer and an uncured saturated ethylene-propylene rubber, to incorporate some styrene into said compositions in order to improve the elastomeric characteristics of the compositions (published Japanese Patent Application No. 17137/83).

The compositions disclosed in the Japanese application are prepared by the heated mixing of the polyolefin and the rubber in the presence of styrene and a peroxide. In these compositions the rubber is not cured, and therefore said compositions do not present the processability problems typically associated with compositions in which the rubber is present in the cured state.

Unexpectedly, it has now been found that it is possible to obtain elastoplastic compositions based on a crystalline olefin polymer and a cured EPDM rubber, endowed with improved processability characteristics even when a high content of cured rubber is present, and which do not require the use of curative systems that cause corrosion problems, when the polyolefin phase comprises, besides the cured rubber, a thermoplastic and amorphous styrene polymer in the form of dispersed particles, of which at least 80% has a maximum size preferably below $5\mu$.

Thus, the compositions of the invention comprise a continuous crystalline polyolefin phase and at least two polymeric phases discretely dispersed in the polyolefin phase, one of which is a dynamically cured EPDM rubber and the other is an amorphous thermoplastic styrene polymer, wherein the EPDM rubber is a copolymer of propylene with ethylene or with an alpha olefin of formula $CH_2=CHR$ in which R is an alkyl radical having 2–10 carbon atoms, and with a copolymerizable diene, the weight ratio between polyolefin resin and EPDM rubber ranging from about 10/90 to about 75/25 and the weight ratio between styrene polymer and polyolefin ranging from about 10/90 to about 60/40.

Advantageously, in the compositions according to the present invention, at least 80% of the particles of the dispersed EPDM rubber have a maximum particle size below $5\mu$.

Preferably, the particle sizes of both the dispersed phases are such that at least 80% has a maximum size below $5\mu$, most preferably below $2\mu$.

The determination of the particle size is carried out by electronic microscopy.

Utilizable styrene polymers include all the amorphous polymers and copolymers having thermoplastic characteristics.

Examples of such polymers are "crystal" polystyrene (PS), high impact polystyrene (HIPS), the thermoplastic copolymers of styrene with acrylonitrile and maleic anhydride, and the partially hydrogenated styrene-butadiene block copolymers.

Examples of partially hydrogenated styrene-butadiene block copolymers are represented by the copolymers described in U.S. Pat. No. 4,107,130.

Polystyrene (PS and HIPS), the copolymers of styrene with acrylonitrile containing up to 30% by weight of acrylonitrile, the styrene-ethylene-butene block copolymers are the preferred materials.

The compositions according to the present invention are prepared by mixing an olefin polymer and styrene polymer to form a homogeneous mixture, adding the homogeneous mixture to an EPDM rubber, mixing to form a homogeneous blend, adding the curative system to the resulting homogeneous blend, and continuing the mastication of the blend at a temperature between about 150° C. and 280° C. for a time period sufficient to cure the rubber.

In order to obtain dispersions, in which the particle sizes have the above-indicated values, it is necessary to utilize, during the homogenization step of the styrene polymer with the polyolefin resin, suitable compatibilizing agents such as graft copolymers of styrene on polyolefins, graft copolymers of EPDM rubber on polystyrene or on styrene-acrylonitrile acrylonitrile copolymers, and styrene-propylene block copolymers.

These compatibilizing agents are utilized in an amount generally ranging from 5 to 50% by weight based on the polyolefin-polystyrene mixture.

Styrene block copolymers containing blocks of monomeric units compatible with the polyolefins, such as the styrene-ethylene-butene block copolymers, are also suitable for the preparation of dispersions having the desired dimensional characteristics.

In order to obtain a homogeneous dispersion of the polystyrene phase it is useful to previously prepare an alloy with the polyolefin; such alloy is then used to prepare the elastoplastic compositions of the invention.

For the preparation of the alloys, all the methods suitable for obtaining an intimate mixing and homogenization of the components are utilizable. For example, it is possible to prepare same in an internal mixer or in an extruder or in a system composed of a mixer and a granulator.

For example, an alloy can be properly prepared by dry mixing the polyolefin in a turbomixer, optionally with HIPS and polystyrene, in the presence of a peroxide and of styrene in such amount as to form the desired percentage of styrene homopolymer and of a graft copolymer of styrene on the polyolefin. It is operated at temperatures in which no softening and consequent thickening of the polymer mixture can occur.

As regards the size of the dispersed particles of the styrene polymer present in the alloys, it has been found that final compositions can be obtained still having satisfactory properties even when the dispersed phase or at least 80% of it has a maximum size of 40μ.

The useful crystalline polyolefin resins include (high, mean or low density) polyethylene and the polymers of the alpha olefins of formula $CH_2=CHR$ in which R is an alkyl radical of 1–8 carbon atoms prepared by using Ziegler-Natta stereospecific catalysts.

Polypropylene having a high isotacticity index is the preferred polymer. Other useful polyolefins are polybutene, poly-4-methyl-1-pentene and polyhexene.

In the compositions of the invention the olefin polymer can be presented in a modified form as compared with the starting polymer. That is due to interactions with the curative system, the styrene polymer and the EPDM rubber, which can cause also an appreciable lowering of the crystalline melting point (determined by D.S.C.).

The EPDM rubbers are copolymers of propylene with ethylene or with another alpha olefin having formula $CH_2=CHR$ in which R is an alkyl radical of 2–10 carbon atoms, and with a diene monomer which is present preferably in an amount ranging from 1 to 10% by weight of the total weight of the copolymer. Preferably the diene is of the non-conjugated type.

Suitable diene monomers are, for example, 1,4-hexadiene; 2-methyl-1,4-pentadiene; 1,4,9-decatriene; 1,5-cyclooctadiene; 1-methyl-1,5-cyclooctadiene; 1,4-cyclopentadiene; dicyclopentadiene; ethylidene norbornene; 4-methyl-1,4-hexadiene; 5-methyl-1,4-hexadiene; the substituted derivatives of such monomers.

Examples of olefin monomers of formula $CH_2=CHR$ are 1-butene, 1-pentene, 1-hexene, 4-methyl-1-pentene, 3-methyl-1-pentene, 3,3-dimethyl-1-butene, 3-methyl-1-hexene, 2,4,4,-trimethyl-1-pentene.

The ethylene-propylene-diene terpolymers containing from 25 to 50% by weight of copolymerized propylene units are preferred In the compositions, the olefin polymer/EPDM rubber ratio is in the range of from about 10/90 to about 75/25, e.g. from about 10/90 to about 60/40 and preferably from 15/85 to 50/50; the styrene polymer/polyolefin ratio is generally in the range of from about 10/90 to about 60/40 and preferably from 30/70 to 50/50.

The ratio between the total weight of the polyolefin and of the styrene polymer and the weight of the EPDM rubber generally ranges from 20/80 to 70/30 and preferably from 25/75 to 60/40.

Mineral fillers, carbon black, colored pigments, plasticizers, stabilizers, extender oils, and in general all the conventional ingredients of the elastoplastic compositions comprising EPDM rubbers can be present in the compositions of the invention.

The compositions are prepared by masticating homogeneous blends of the components, under EPDM rubber dynamic curing conditions.

It is possible to operate according to the dynamic curing methods described in U.S. Pat. Nos. 4,130,535 and 4,311,628, utilizing the curative systems therein described.

However, in another embodiment of this invention, it has been found that it is not necessary, for preparing the compositions of the invention, to use curative systems with corrosive characteristics like those comprising a phenolic resin and an activator.

A totally unexpected result resides in that it is sufficient to use a non-halogenated phenolic resin alone without using activators such as hydrated tin salts and organic acids such as the oxalic, salicylic, malonic and succinic acids.

Non-halogenated phenolic resins are described in U.S Pat. Nos. 3,287,440, 3,709,840 and 4,311,628.

Useful non-halogenated phenolic resins are also available commercially; for example, such resins can be purchased from Schenectady Chemicals Inc. under the trade name FX-RA-148. The non-halogenated phenolic resin is present in the amount of from 1 to 10 parts by weight per 100 parts of rubber.

The temperature conditions under which mastication is conducted (ranging from 150° to 280° C.) and the shear rate employed (300–400 $s^{-1}$) are furthermore appreciably lower than those used up to now.

According to a preferred procedure, a homogeneous blend of olefin polymer, styrene polymer with the EPDM rubber and, optionally, with fillers is prepared by operating at a temperature sufficient to melt the olefin polymer and for a time sufficient to obtain a homogeneous blend. The phenolic resin is then added and mastication is continued at a temperature at which rubber cure occurs.

Preferably, the EPDM rubber is fully cured. Full curing of the rubber means the cure in which the rubber is extractable for less than 2% with cyclohexane at room temperature or for less than 4% with boiling xylene (as regards the methods of determining the extractability in cyclohexane and xylene, reference is made to U.S. Pat. No. 3,806,558).

The blending and/or mastication process can be carried out in an internal mixer, or in an extruder, or in a system consisting of an internal mixer and of a granulator.

It is possible also to use a plurality of apparatuses arranged in series, where in the first ones the intimate blending and homogenization of the composition occurs while curing takes place in another.

The mastication temperature at which curing occurs is generally in the range from 150° to 280° C. and preferably from 180° to 220° C.

The following examples are given merely to illustrate the invention and are not to be considered as a limitation of the scope thereof.

EXAMPLE 1

Table 1 shows the composition of a component mixture used in the preparation of polypropylene-polystyrene alloys suitable for preparing the elastoplastic compositions of the invention.

TABLE 1

| COMPOSITION OF THE COMPONENT MIXTURE AND OF THE THERMOPLASTIC ALLOYS THUS OBTAINED | | | |
|---|---|---|---|
| | Thermoplastic alloy | 1 | 2 |
| Component mixture composition (parts by | Polypropylene (PP) (Moplen FL X020) | 64.2 | 49.1 |
| | t.butylperoxypivalate (in solution at 15%) | 1.0 | 1.2 |

TABLE 1-continued

COMPOSITION OF THE COMPONENT MIXTURE AND
OF THE THERMOPLASTIC ALLOYS THUS OBTAINED

|  | Thermoplastic alloy | 1 | 2 |
|---|---|---|---|
| weight) | High impact polystyrene (HIPS) | — | 34.6 |
|  | Styrene | 34.5 | 14.8 |
|  | Irganox 1010 (*) | 0.2 | 0.2 |
|  | SHT (**) | 0.1 | 0.1 |
| Alloy composition (parts by weight) | Polypropylene | 60 | 45 |
|  | Polystyrene (PS) | 30 | — |
|  | HIPS + PS | — | 45 |
|  | PP-g-PS graft copolymer + PP-g-S | 10 | — |
|  | PP-g-HIPS graft copolymer + PP-g-S | — | 10 |

(*) a phenolic stabilizer sold by Ciba-Geigy (based on pentaerythrityl tetrakis (3,5-ditert-butyl-4-hydroxyphenyl propionate)
(**) synthetic hydrotalcite The alloys were prepared under dry conditions by using a turbomixer operating in a nitrogen atmosphere.

To the polypropylene in flake form and to the HIPS in pellet form, if present, the peroxide and subsequently, under heat and in small batches, the styrene were added.

The styrene addition was complete in 1 hour, and stirring was continued for 2 more hours with slight cooling to prevent the temperature from exceeding 130° C. in order to avoid softening and consequent thickening of the polymer.

The products were gradually cooled and then stabilized with 0.2% of Irganox 1010 and 0.1% of SHT, and then extruded a 210° C.

Selective extractions with methylethylketone and chloroform and subsequent infrared analyses, carried out on the various fractions, revealed in both products the presence of about 10% of polystyrene-g-polypropylene graft copolymer.

The maximum size of the particles of the dispersed styrene polymer phase was, for at least 80%, less than 2μ.

Table 2 shows the compositions and the principal characteristics of the elastoplastic compositions prepared from the polymeric alloys defined in Table 1.

TABLE 2

ELASTIC AND RHEOLOGICAL CHARACTERISTICS OF
THE ELASTOPLASTIC COMPOSITIONS

| Sample | 1 (comparative) | 2 | 3 |
|---|---|---|---|
| Ethylene-propylene-ethylidene-norbornene terpolymer* (Dutral TER 537 E2) | 64 | 64 | 64 |
| Polypropylene (Moplen Q 30P) | 6.5 | — | — |
| High impact-polystyrene | 6.5 | — | — |
| Thermoplastic alloy 2 of Table 1 | — | 13 | — |
| Thermoplastic alloy 1 of Table 1 | — | — | 13 |
| Master FX-RA-148** | 7.2 | 7.2 | 7.2 |
| p-toluenesulfonic acid | 0.4 | 0.4 | 0.4 |
| Zinc oxide | 7.4 | 7.4 | 7.4 |
| Oil | 8 | 8 | 8 |
| PP/(PP + EPDM) ratio | 0.169 | 0.155 | 0.196 |
| Pressure, in kg/cm², (KPa) recorded in TR 15 at 230° C. and a flow rate of 9.5 cc/minute | 150 (15000) | 110 (11000) | 75 (7500) |
| Extrudate appearance | not smooth | smooth | smooth |
| Tension set at 23° C. at 200%, % | breaks | 20 | 20 |
| Compression set at 100° C., | 45 | 27 | 23 |

TABLE 2-continued

ELASTIC AND RHEOLOGICAL CHARACTERISTICS OF
THE ELASTOPLASTIC COMPOSITIONS

| Sample | 1 (comparative) | 2 | 3 |
|---|---|---|---|
| 22 hours, % | | | |

*containing 50% by weight of extender oil.
**Master FX-RA-148 is composed of:
50% of SP 1045 phenolic resin
50% of barium sulfate.

The compositions reported herein, like the ones of the following examples, were prepared by introducing the polymeric components into a Brabender internal mixer and, after a short mixing of period, by adding the curing system and subsequently the zinc oxide and the extender oil.

Thereafter, the mixing was continued for 3 minutes at a temperature of 200° C.

The composition was then discharged from the internal mixer and was subjected to the following determinations:

Processability, by measuring the head pressure in the extruder during the extrusion tests. In such tests, the extruder was of type TR 15 (single-screw, 15 mm diameter), and it was operated at a temperature of 230° C., with a 2.5 mm ID die, a L/D ratio=20 and at a flow rate of 9.5 cc/minute.

Tension set at 200%, measured at 23° C., according to ASTM D-412.

Compression set after 22 hours at 100° C., according to ASTM D-395.

The advantages deriving from the use of the alloys comprising the amorphous styrene phase are apparent also for the harder elastoplastic compositions having higher crystalline olefin resin/elastomeric terpolymer ratios (see Table 3).

Dutral TER 537 E2 is an EPDM rubber produced by DUTRAL; Moplen Q 30P is sold by HIMONT ITALIA.

TABLE 3

ELASTIC AND RHEOLOGICAL CHARACTERISTICS
OF ELASTOPLASTIC COMPOSITIONS BASED ON
THERMOPLASTIC ALLOY 2 OF TABLE 1

| Sample | 1 (comparative) | 2 | 3 (comparative) | 4 |
|---|---|---|---|---|
| Dutral TER 537 E2* | 59 | 59 | 52 | 52 |
| Moplen Q 30P | 18 | — | 25 | — |
| Thermoplastic alloy 2 (see Table 1) | — | 18 | — | 25 |
| Master FX-RA-148 | 7.2 | 7.2 | 7.2 | 7.2 |
| p-toluenesulfonic acid | 0.4 | 0.4 | 0.4 | 0.4 |
| Zinc oxide | 7.4 | 7.4 | 7.4 | 7.4 |
| Oil | 8 | 8 | 8 | 8 |
| PP/(PP + EPDM) ratio | 0.379 | 0.215 | 0.490 | 0.302 |
| Pressure, in Kg/cm² (KPa) recorded in TR 15 at 230° C. at a flow rate of 9.5 cc/minute | 50 (5000) | 25 (2500) | 40 (4000) | 25 (2500) |
| Tension set at 23° C. at 200%, % | breaks | breaks | breaks | breaks |
| Compression set at 100° C., 22 h, % | 36 | 34 | 64 | 55 |
| Hardness, Shore A | 70 | 70 | 85 | 85 |

*containing 50% by weight of extender oil.
In the elastoplastic compositions of Table 2 (sample 2 and 3) and Table 3 (samples 2 and 4) more than 90% of the particles of the dispersed phase have a maximum size below 2 μm.

EXAMPLE 2

Table 4 shows the compositions of various alloys used for preparing the elastoplastic compositions.

TABLE 4
COMPOSITION OF THE ALLOYS USED FOR PREPARING ELASTOPLASTIC COMPOSITIONS

| Alloy | 1 | 2 |
|---|---|---|
| Moplen Q 30P | 50 | 50 |
| Ultrastyr W 275* | 50 | — |
| Ultrastyr AES Y42** | — | 50 |

*Ultrastyr W 275 is a polystyrene grafted with 10% of Dutral TER 044 (Ultrastyr is a product sold by MONTEDIPE S.p.A.).
**Ultrastyr AES Y42 is a styrene-acrylonitrile copolymer (75% S - 25% AN) grafted with 30% of Dutral TER 044 EPDM rubber.

Table 5 shows the compositions and main characteristics of the compositions prepared from the alloys of Table 4.

In alloy 1, the maximum size of more than 80% of the dispersed particle phase present in alloy 1 was of 40μ.

TABLE 5
ELASTIC AND RHEOLOGICAL CHARACTERISTICS OF ELASTOPLASTIC COMPOSITIONS BASED ON THERMOPLASTIC ALLOYS OF TABLE 4

| Sample | 1 | 2 |
|---|---|---|
| Dutral TER 537 E2* | 64 | 64 |
| Thermoplastic alloy 1 (see Table 4) | 13 | — |
| Thermoplastic alloy 2 (see Table 4) | — | 13 |
| Master FX-RA-148 | 7.2 | 7.2 |
| p-toluenesulfonic acid | 0.4 | 0.4 |
| Zinc oxide | 7.4 | 7.4 |
| Oil | 8 | 8 |
| PP/(PP + EPDM) ratio | 0.169 | 0.169 |
| Pressure, in Kg/cm² (KPa) recorded in TR 15 at 230° C. at a flow rate of 9.5 cc/minute | 80 (8000) | 110 (11000) |
| Extrudate appearance | smooth | smooth |
| Tension set at 23° C. at 200%, % | 21 | 20 |
| Compression set at 100° C., 22 h, % | 27 | 25 |

*containing 50% by weight of extender oil

EXAMPLE 3

Table 6 shows the compositions of the alloys used in preparing elastoplastic compositions.

TABLE 6
COMPOSITION OF THE ALLOYS USED IN PREPARING ELASTOPLASTIC COMPOSITIONS

| Alloy | 1 | 2 | 3 | 4 |
|---|---|---|---|---|
| Moplen Q 30P | 42 | 50 | 62 | 69 |
| Kraton G 1652 | 58 | 50 | 38 | 31 |

Table 7 shows the composition and characteristics of the compositions prepared with the alloys of Table 6.

In alloys 1-4, more than 90% of the particles of the dispersed (polystyrene) phase has a maximum size below 2μ.

TABLE 7
ELASTIC AND RHEOLOGICAL CHARACTERISTICS OF COMPOSITIONS BASED ON THERMOPLASTIC ALLOYS OF TABLE 6

| Sample | 1 | 2 | 3 | 4 | 5 comparison | 6 comparison |
|---|---|---|---|---|---|---|
| Dutral TER 537-E2 (50% oil) | 64 | 64 | 64 | 64 | 70.8 | 66 |
| Moplen Q 30P | — | — | — | — | 6.2 | 11 |
| Alloy 1 | 13 | — | — | — | — | — |
| Alloy 2 | — | 13 | — | — | — | — |
| Alloy 3 | — | — | 13 | — | — | — |
| Alloy 4 | — | — | — | 13 | — | — |
| Master FX-RA-148 | 7.2 | 7.2 | 7.2 | 7.2 | 7.2 | 7.2 |
| p-toluenesulfonic acid | 0.4 | 0.4 | 0.4 | 0.4 | 0.4 | 0.4 |
| Zinc oxide | 7.4 | 7.4 | 7.4 | 7.4 | 7.4 | 7.4 |
| Oil | 8 | 8 | 8 | 8 | 8 | 8 |
| PP/(PP + EPDM) ratio | 0.147 | 0.169 | 0.200 | 0.219 | 0.15 | 0.25 |
| Pressure, in Kg/cm² (KPa) recorded in TR 15 at 230° C. at a flow rate of 9.5 cc/minute | 130 (13000) | 115 (11500) | 90 (9000) | 70 (7000) | 90 (9000) | 55 (5500) |
| Extrudate appearance | smooth | smooth | smooth | smooth | melt fracture | melt fracture |
| Tension set at 23° C. at 200%, % | — | — | 16 | — | breaks | breaks |
| Compression set at 100° C., 22 h, % | 23 | 22 | 24 | 25 | 16 | 24 |

These compositions are very interesting as they exhibit excellent elastic characteristics even at high temperatures as well as good processability.

EXAMPLE 4

Example 4 illustrates compositions in which a non-halogenated phenolic resin alone is used as the curative.

Table 8 shows the compositions and characteristics of such compositions.

TABLE 8
COMPOSITION AND CHARACTERISTICS OF ELASTOPLASTIC COMPOSITIONS CURED IN THE ABSENCE OF P-TOLUENESULFONIC ACID

| Sample | 1 | 2 | 3 (comparison) |
|---|---|---|---|
| Dutral TER 537 E2 (50% oil) | 68 | 68 | 71.5 |
| Moplen Q 30P | 8.5 | 8.5 | 9 |
| Ultrastyr W 275 | 4 | — | — |
| Kraton G 1652 | — | 4 | — |
| Master FX-RA-148 | 4 | 4 | 4 |
| Zinc oxide | 7.5 | 7.5 | 7.5 |
| Oil | 8 | 8 | 8 |
| PP/(PP + EPDM) ratio | 0.200 | 0.200 | 0.20 |
| Pressure, in Kg/cm² recorded in TR 15 at 230° C. at a flow rate of 9.5 cc/minute | 100 | 100 | 80 |
| Extrudate appearance | smooth | smooth | melt fracture |
| Tension set at 23° C. at 200%, % | 14 | 14 | breaks |

TABLE 8-continued

COMPOSITION AND CHARACTERISTICS OF
ELASTOPLASTIC COMPOSITIONS CURED IN
THE ABSENCE OF P-TOLUENESULFONIC ACID

| Sample | 1 | 2 | 3 (comparison) |
|---|---|---|---|
| Compression set at 100° C., 22 h, % | 16 | 18 | 20 |
| Hardness, Shore A | 56 | 50 | 58 |

What is claimed is:

1. An elastomeric composition comprising a continuous crystalline polyolefin phase and at least two polymeric phases of discrete particles dispersed in the polyolefin phase, one of which consists of a dynamically fully cured EPDM rubber and the other of an amorphous thermoplastic styrene polymer selected from the group consisting of polyestyrene, high impact polystyrene, copolymers of styrene with acrylonitrile containing up to 30% by weight of acrylonitrile, styrene-ethylene-butene-styrene block copolymer and partially hydrogenated styrene-butadiene block copolymers, wherein the EPDM rubber is copolymer of ethylene with propylene or with an alpha-olefin of the formula $CH_2=CHR$ in which R is an alkyl radical having 2–10 carbon atoms, and with a copolymerizable diene, the weight ratio between polyolefin resin and EPDM rubber ranges from about 10/90 to about 75/25 and the weight ratio between styrene polymer and polyolefin ranges from 10/90 to about 60/40 and at least 80% of the particles of the dispersed phases have a maximum size below 5μ.

2. The composition of claim 1 in which at least 80% of the particles of the two dispersed phases have a maximum size of 2μ.

3. The composition of claim 1 in which the polyolefin is highly isotactic polypropylene.

4. The composition of claim 1 in which the styrene polymer is a styrene-ethylene-butene-styrene block copolymer.

5. The composition of claim 1 which further comprises a graft copolymer of styrene on a polyolefin.

6. The composition of claim 1 which further comprises a compatibilizing agent selected from the group consisting of a graft copolymer of an EPDM rubber on polystyrene and a graft copolymer of an EPDM rubber on a copolymer of styrene and acrylonitrile.

7. A process for preparing the elastoplastic composition, of claim 1 comprising an olefin polymer and a styrene polymer selected from the group consisting of polystyrene, high impact polystyrene, copolymers of styrene with acrylonitrile containing up to 30% by weight of acrylonitrile, styrene-ehtylene-butene-styrene block copolymer and partially hydrogenated styrene-butadiene block copolymer to form a homogeneous mixture, adding the homogeneous mixture to an EPDM rubber, mixing to form a homogeneous blend, adding a curative system consisting essentially of a non-halogenated phenolic resin to the resulting homogeneous blend, and continuing the mastication of the blend at a temperature of between about 150° and 280° for a time period sufficient to fully cure the rubber.

8. The process of claim 7 in which the non-halogenated phenolic resin is present an amount of from 1 to 10 parts by weight per 100 parts of rubber.

* * * * *

UNITED STATES PATENT AND TRADEMARK OFFICE
CERTIFICATE OF CORRECTION

PATENT NO. : 4,889,888

DATED : December 26, 1989

INVENTOR(S) : Mauro Bassi; Enea Garagnani; Giuseppe Gorini

It is certified that error appears in the above-identified patent and that said Letters Patent is hereby corrected as shown below:

Column 5, line 33, "a" should be -- at --.

Column 10, Claim 7, line 17, after "comprising," insert -- mixing --.

Column 10, Claim 8, line 32, after "present," insert -- in --.

Signed and Sealed this

Twenty-fourth Day of April, 1990

Attest:

HARRY F. MANBECK, JR.

Attesting Officer

Commissioner of Patents and Trademarks